US009170394B2

(12) United States Patent
Sugiura

(10) Patent No.: US 9,170,394 B2
(45) Date of Patent: Oct. 27, 2015

(54) LENS DRIVING APPARATUS AND LENS DRIVING METHOD

(71) Applicant: RICOH IMAGING COMPANY, LTD., Tokyo (JP)

(72) Inventor: Koichi Sugiura, Kanagawa (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/167,261

(22) Filed: Jan. 29, 2014

(65) Prior Publication Data

US 2014/0211323 A1  Jul. 31, 2014

(30) Foreign Application Priority Data

Jan. 30, 2013  (JP) ................................. 2013-015014

(51) Int. Cl.
| | |
|---|---|
| *G02B 15/14* | (2006.01) |
| *G03B 17/00* | (2006.01) |
| *G02B 7/09* | (2006.01) |
| *G02B 7/04* | (2006.01) |
| G02B 7/02 | (2006.01) |
| G02B 7/10 | (2006.01) |
| G02B 7/36 | (2006.01) |

(Continued)

(52) U.S. Cl.
CPC .. *G02B 7/09* (2013.01); *G02B 7/04* (2013.01); *G02B 15/14* (2013.01); *G03B 17/00* (2013.01); *G02B 7/02* (2013.01); *G02B 7/10* (2013.01); *G02B 7/102* (2013.01); *G02B 7/36* (2013.01); *G03B 3/10* (2013.01); *G03B 7/12* (2013.01)

(58) Field of Classification Search
CPC .............. G02B 7/00; G02B 7/02; G02B 7/04; G02B 7/09; G02B 7/10; G02B 7/36; G02B 15/00; G02B 15/14; G03B 17/00; G03B 17/12
USPC .......... 359/694–698, 823; 396/72, 73, 75–77, 396/79–82
See application file for complete search history.

(56) References Cited

U.S. PATENT DOCUMENTS 4,723,139 A * 2/1988 Ogasawara ................... 396/133
4,851,869 A 7/1989 Ishimaru et al.

(Continued)

FOREIGN PATENT DOCUMENTS

| JP | 01-161325 | 6/1989 |
|---|---|---|
| JP | 04-281416 | 10/1992 |

(Continued)

*Primary Examiner* — Loha Ben
(74) *Attorney, Agent, or Firm* — Greenblum & Bernstein P.L.C.

(57) ABSTRACT

A lens driving apparatus and a lens driving method are capable of quickly and precisely setting the position of a lens to a predetermined position, if the resolving power of the amount of lens moving according to drive pulses is not even in the lens driving apparatus. A count pulse signal detection unit detects a count pulse signal CP in accordance with a rotation of a manual focus (MF) ring. A lens driving control unit outputs a drive pulse MP for moving a focus lens in correspondence with the detected count pulse signal CP to a lens driving unit. The lens driving control unit performs a control so that: the number of the drive pulses MP for a count period T differs between a time period within an initial count detection time period for the detected count pulse signal CP and a time period after the initial count signal detection time period; and the number of pulses for the former period is minimum and the number of pulses for the latter period is larger than the minimum number.

20 Claims, 8 Drawing Sheets

(51) Int. Cl.
   *G03B 7/12* (2006.01)
   *G03B 3/10* (2006.01)

(56) References Cited

U.S. PATENT DOCUMENTS

| | | | |
|---|---|---|---|
| 4,935,763 A * | 6/1990 | Itoh et al. | 396/81 |
| 5,450,161 A | 9/1995 | Ichinose | |
| 5,648,836 A | 7/1997 | Sato et al. | |
| 5,771,410 A | 6/1998 | Sato et al. | |
| 5,832,318 A | 11/1998 | Sato et al. | |
| 7,773,914 B2 * | 8/2010 | Funamoto et al. | 399/167 |

FOREIGN PATENT DOCUMENTS

| | | |
|---|---|---|
| JP | 05-333256 | 12/1993 |
| JP | 06-242361 | 9/1994 |
| JP | 2001-166196 | 6/2001 |

* cited by examiner

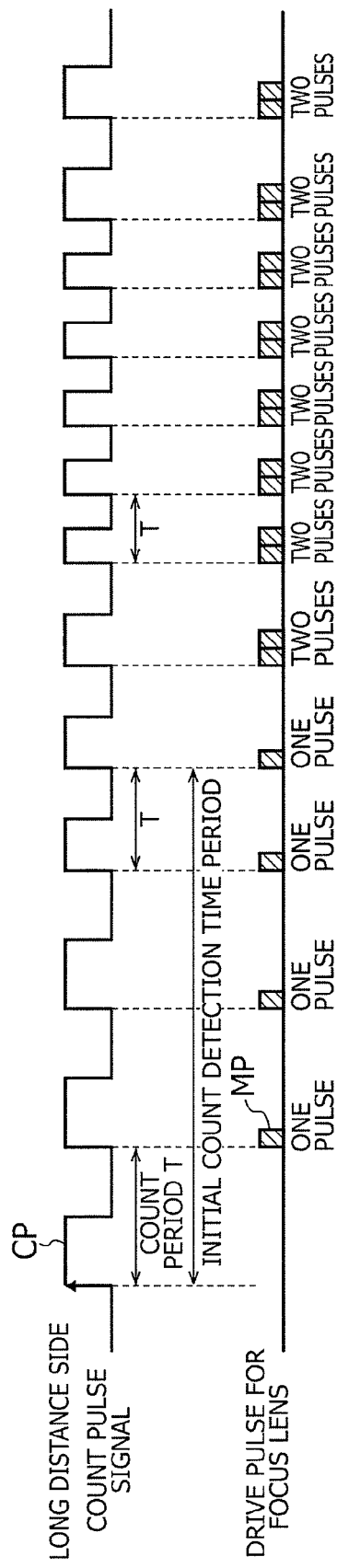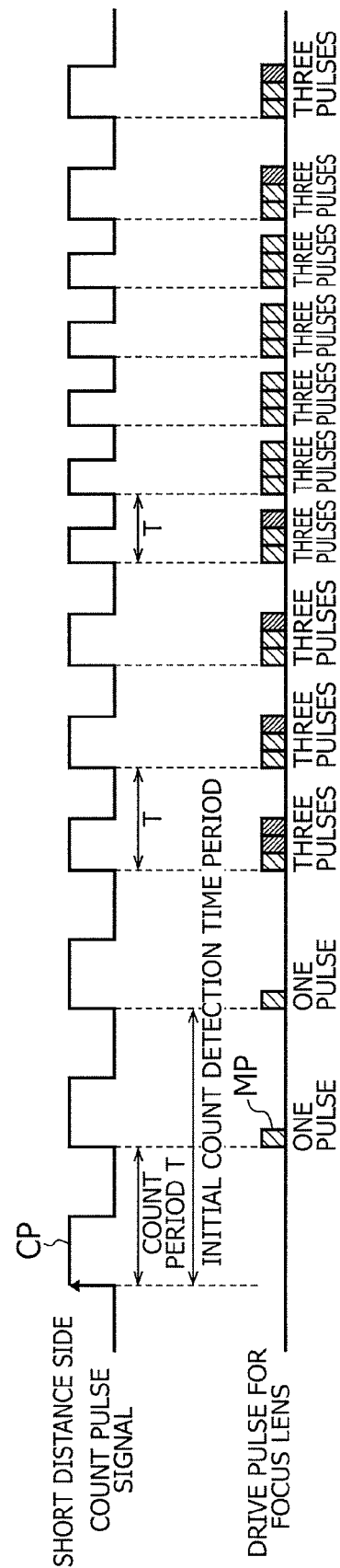

LENS DRIVING APPARATUS AND LENS DRIVING METHOD

BACKGROUND OF THE INVENTION

1. Field of the Invention

The present invention relates to a lens driving apparatus and a lens driving method configured to drive a lens by operating a rotation operation member that is not mechanically coupled to the lens.

2. Description of Related Art

A conventional method relates to a lens driving apparatus configured to drive a lens, such as a focus lens and a zoom lens built in a camera lens barrel. The lens driving apparatus is configured to output a rotation signal when a rotation operation member not mechanically coupled to the lens, such as a focus operation ring or a zoom operation ring, is operated and to drive the lens by means of an actuator including a motor mechanism, and the like, based on the rotation signal. Japanese Patent Application Laid-Open No. 01-161325 discusses a lens driving apparatus including a pulse generation unit configured to generate a pulse signal when an operation member is manually operated; and a motor driving control unit configured to drive a focus lens according to the generated pulse signal. In addition, Japanese Patent Application Laid-Open No. 01-161325 includes units configured to detect an amount and a speed of an operation of the operation member, respectively. By controlling the motor driving control unit according to the detected operation amount and the detected operation speed, the lens can be quickly driven, and by a large amount, when the operation member is quickly operated, whereas the lens can be driven slowly, and by a small amount, when the operation member is slowly operated. Thus, Japanese Patent Application Laid-Open No. 01-161325 can implement a lens driving apparatus that is very easy to operate. Similarly, Japanese Patent Application Laid-Open No. 06-242361 discusses a lens driving apparatus including a pulse generation unit configured to generate a pulse signal when an operation member is manually operated, and a lens driving mechanism configured to drive a lens according to the pulse signal. In Japanese Patent Application Laid-Open No. 06-242361, a lens driving control is performed by using the speed of operation of the operation member as one parameter and with reference to the other parameters such as the operation amount, the focal length, the subject distance, and the like to reduce difficulty in operating the operation member.

In both Japanese Patent Application Laid-Open No. 01-161325 and Japanese Patent Application Laid-Open No. 06-242361, the lens driving control is carried out according to the speed and the amount of an operation of the operation member. However, these conventional apparatuses do not consider the resolving power for the lens driving amount. Accordingly, these conventional apparatuses do not satisfy the speed and the precision required in setting the lens to a predetermined position. More specifically, FIG. 8 shows an example of the resolving power for the focus lens built in a lens barrel of a camera. The axis of the abscissa denotes a lens position of a focus lens FL with respect to an image sensor (charge-coupled device (CCD)) and the axis of the ordinate denotes a subject distance (corresponding to the lens in-focus position). A focus lens driving apparatus includes a stepping motor that rotates stepwise according to a drive pulse. Therefore, the lens position denoted on the axis of the abscissa corresponds to the number of drive pulses to be supplied to a stepping motor for driving the lens. The axis of the ordinate denotes the short distance side in its lower part and the long distance side in its upper part.

As can be understood from FIG. 8, the number of drive pulses with respect to variation of the in-focus position is large on the short distance side of the focus lens FL, whereas the number of drive pulses is small on the long distance side. The above-mentioned resolving power can be also referred to as the amount of variation of the in-focus position with respect to one drive pulse. It is understood that the resolving power is uneven in relation to the variation of the in-focus position. Accordingly, because the variation of the in-focus position occurring according to one drive pulse is small (i.e., because the resolving power is fine (high)) on the short distance side of the focus lens, focusing can be precisely performed. However, in changing the in-focus position by a large amount, it becomes difficult to perform quick focusing because a large number of pulses are required. On the other hand, on the long distance side, the variation of the in-focus position occurring according to one drive pulse is great (i.e., the resolving power is low). Accordingly, the focusing can be quickly performed when the in-focus position is changed by a large amount. However, it becomes difficult to perform precise focusing. In both Japanese Patent Application Laid-Open No. 01-161325 and Japanese Patent Application Laid-Open No. 06-242361, the lens driving speed and the lens driving amount are merely controlled according to the speed of an operation of the operation member. Accordingly, the control of the driving speed and the driving amount cannot be performed following the variation of the in-focus position. Therefore, in these conventional apparatuses, it is difficult to satisfy both the speed and the precision required in focusing on both the short distance side and the long distance side described above at the same time. The problem of speed and precision occurring in setting the lens position, caused due to uneven resolving power with respect to the lens drive amount, may arise not only in the case of a focus lens but also in a case of a zoom lens, where the lens driving is performed between the telephoto end and the wide-angle end.

The purpose of the present invention is to provide a lens driving apparatus and a lens driving method capable of quickly and precisely setting a lens to a predetermined position in a lens driving apparatus in which the resolving power of lens moving amount according to a drive pulse is uneven.

SUMMARY OF THE INVENTION

In a first aspect of a lens driving apparatus according to the present invention, a lens driving apparatus includes: a signal detection unit configured to detect a signal output according to an operation of an operation member; a lens driving unit configured to drive a lens in correspondence with an input drive signal; and a lens driving control unit configured to control the drive signal input to the lens driving unit according to the detected detection signal. The lens driving control unit is configured to control the drive signal so that the lens driving amounts corresponding to the detection signal are different between a time period within an initial detection time period for the detection signal and a time period after the initial detection time period has elapsed.

In the first aspect of the invention, the drive signal is controlled so that the lens driving amount, controlled by the lens driving control unit for the time period after the initial signal detection time period, is larger than the lens driving amount, controlled by the lens driving control unit for the time period within the initial signal detection time period. In addition, the drive signal is controlled so that the lens driving amount for the time period after the initial signal detection time period differs in accordance with a difference in lens positions of the lens.

In a second aspect of the invention, which is an embodiment of the first aspect of the invention, a lens driving apparatus includes: a count pulse generation unit configured to generate a count pulse signal according to an operation of an operation member; a count pulse signal detection unit configured to detect the generated count pulse signal; a lens driving unit configured to move a lens in correspondence with the number of input drive pulses; and a lens driving control unit configured to control the number of the drive pulses input to the lens driving unit according to the detected count pulse signal. The lens driving control unit is configured to control the number of drive pulses with respect to the count pulse signal so that the number of drive pulses is different between a time period within an initial count detection time period for the detected count pulse signal and a time period after the initial count signal detection time period.

In the second aspect of the present invention, the operation member is a manual focus ring provided on a lens barrel, the lens is a focus lens built in the lens barrel, and the lens driving unit is a unit configured to move the focus lens in a direction along an optical axis of the lens barrel. In this aspect, the number of drive pulses, controlled by the lens driving control unit, for a time period after the initial count detection time period is larger than the number of drive pulses, controlled by the lens driving control unit, for a time period within the initial count detection time period. For example, the number of drive pulses of the lens driving unit, for a time period within the initial count detection time period, is a minimum unit. The lens is moved under a condition in which one pulse of the input drive pulses is the minimum unit number.

In addition, in the second aspect of the present invention, the number of drive pulses for a time period after the initial count detection time period differs according to a lens position of the focus lens. For example, the number of drive pulses for a time period after the initial count detection time period is larger when the lens position of the focus lens is on a short distance side than when the focus lens position is on a long distance side. Alternatively, the initial count detection time period differs according to the lens position of the focus lens. For example, the initial count detection time period is set longer when the lens position of the focus lens is on the long distance side than the initial count detection time period set when the focus lens position is on the short distance side.

In a third aspect of the lens driving method of the present invention, a method for driving a lens includes: detecting a signal output when an operation member is operated, by using a signal detection unit; controlling a drive signal input to a lens driving unit according to the detected detection signal, by using a lens driving control unit; and driving a lens according to the input drive signal, by using the lens driving unit. The lens driving control unit performs a control, in which the lens driving amount according to the drive signal based on the detection signal, for a time period within the initial signal detection time period for the detection signal, is small, and the lens driving amount according to the drive signal based on the detection signal, for a time period after the initial signal detection time period, is large.

In a fourth aspect of the present invention, which is an embodiment of the lens driving method of the third aspect of the invention, a method for driving a lens includes: detecting a count pulse signal generated by a count pulse generation unit when an operation member is operated, by using a count pulse signal detection unit; controlling the number of drive pulses input to a lens driving unit according to the detected count pulse signal, by using a lens driving control unit; and moving a lens in correspondence with the number of input drive pulses, by using the lens driving unit. The lens driving control unit performs a control in which a pulse number of the drive pulse with respect to the count pulse signal is set to be small for a time period within an initial count detection time period for the detected count pulse signal, and a pulse number of the drive pulse with respect to the count pulse signal is set to be large for a time period after the initial count signal detection time period.

According to the present invention, a lens driving apparatus and a lens driving method, capable of quickly and precisely setting a lens to a predetermined position in a lens driving apparatus in which the resolving power of lens moving amount according to a drive pulse is uneven, can be provided.

BRIEF DESCRIPTION OF THE DRAWINGS

In the accompanying drawings:

FIGS. 5A and 5B respectively illustrate the correspondence between count pulse signals and drive pulses.

DESCRIPTION OF THE EMBODIMENTS

Figure 1:
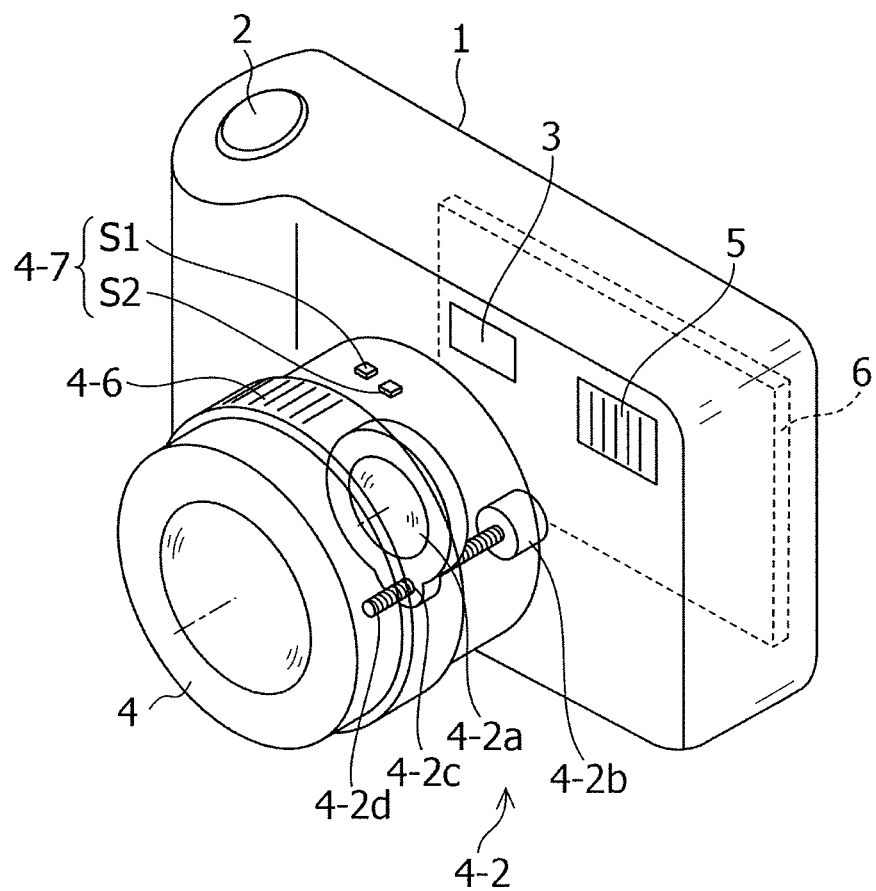
FIG. 1 is a perspective outline view that illustrates a part of a digital camera to which the present invention is applied.

Hereinafter, embodiments of the present invention will be described below with reference to attached drawings. FIG. 1 is a perspective outline view illustrating a part of a digital camera, in which the present invention is applied to a focusing apparatus. A camera body 1 includes a release button 2, a viewfinder 3, a lens barrel 4, a strobe emission unit 5, and an LCD monitor 6. A photographic optical system including a focusing optical system 4-2 is built in the lens barrel 4. In the focusing optical system 4-2, the focusing on the object is carried out by moving a focus lens 4-2a in a direction of the barrel axis, i.e., in a direction of the optical axis, in the lens barrel 4. An AF (autofocus) device capable of performing automatic focusing is built in the focusing optical system 4-2. However, in the present invention, an MF (manual focus) ring 4-6, i.e., an operation member or a rotation operation member according to the present invention, is arranged on the outer periphery of the lens barrel 4 so that focusing can be performed also by a manual operation. A photographer can operate a mode setting button (not illustrated) provided on the camera body 1 to set an MF mode for the shooting mode, thereby manipulating the MF ring 4-6a rotationally to carry out focusing by the focusing optical system 4-2.

Figure 2:
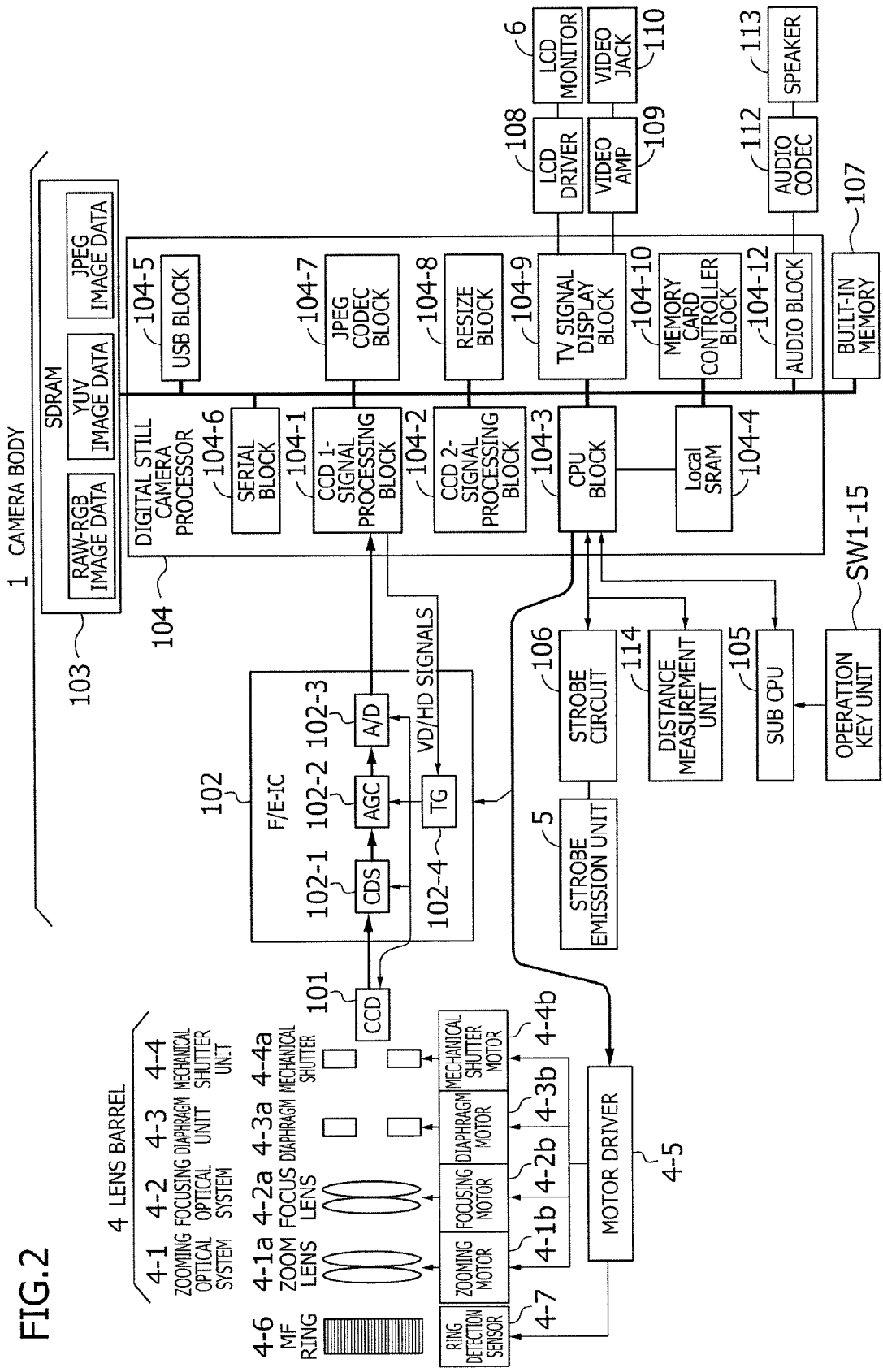
FIG. 2 is a block diagram illustrating the entire configuration of the digital camera to which the present invention is applied.

FIG. 2 is a block configuration diagram illustrating the entire configuration of the digital camera. The lens barrel 4 includes a zooming optical system 4-1, a focusing optical system 4-2, a diaphragm unit 4-3, and a mechanical shutter unit 4-4. The zooming optical system 4-1 includes a zoom lens 4-1a, which captures an optical image of an object, and a zooming drive motor 4-1b. The focusing optical system 4-2 includes a focus lens 4-2a and a focusing drive motor 4-2b. The diaphragm unit 4-3 includes a diaphragm 4-3a and a diaphragm motor 4-3b. The mechanical shutter unit 4-4 includes a mechanical shutter 4-4a and a mechanical shutter motor 4-4b. Furthermore, the lens barrel 4 includes a motor driver 4-5 which drives the respective motors. In addition, the lens barrel 4 includes a ring detection sensor 4-7, which outputs a count pulse signal when the MF ring 4-6 is rotationally manipulated. The sensor 4-7 will be described in detail below.

Inside the camera body 1, a CCD 101 is arranged as a solid-state image sensor for photoelectrically converting the optical image of the object imaged in the lens barrel 4. The CCD 101 is connected with a front end (F/E)-integrated circuit (IC) 102. The F/E-IC 102 includes: a correlated double sampling (CDS) circuit 102-1, which performs correlated double sampling for removing image noises; an automatic gain controller (AGC) 102-2, which performs a gain control; an analog-to-digital (A/D) conversion circuit 102-3, which performs conversion of analog data to a digital signal; and a timing signal generator (TG) 102-4, which generates a drive timing signal. Vertical synchronization signals and horizontal synchronization signals are supplied from the CCD 1-signal processing block 104-1 to the TG 102-4. The CCD 101 is controlled by a central processing unit (CPU) block 104-3 and outputs a photoelectric image of an object image captured according to the drive timing signal from the TG 102-4.

A digital still camera processor 104 includes: a CCD 1-control block 104-1, which performs white balance setting and gamma setting to output data from the F/E-IC 102 and supplies the vertical synchronization signals and the horizontal synchronization signals; a CCD 2-control block 104-2, which performs conversion into luminance data and color difference data by performing filtering processing; the CPU block 104-3, which control units, circuits, and blocks included in the lens barrel 4 and the F/E-IC 102; and a local static random access memory (SRAM) 104-4, which temporarily stores data and the like necessary for the above-described control. In addition, the digital still camera processor 104 includes a universal serial bus (USB) block 104-5, which performs a USB communication with an external apparatus such as a personal computer; and a serial block 104-6, which performs a serial communication with an external apparatus such as a personal computer. In addition, the digital still camera processor 104 includes a Joint Photographic Experts Group (JPEG) CODEC block 104-7, which performs JPEG compression and decompression; a RESIZE block 104-8, which enlarges or reduces the size of the image data by interpolation processing; a television (TV) signal display block 104-9, which converts image data into video signals for display on an external display apparatus, such as a liquid crystal monitor or a TV set; and a memory card block 104-10, which controls a memory card which records photographed image data.

A synchronous dynamic random access memory (SDRAM) 103 and a built-in memory 107 are connected with the digital still camera processor 104 as data recording units. The SDRAM 103 temporarily stores image data in performing various kinds of processes on image data by the digital still camera processor 104. Examples of such image data to be stored include: "RAW-RGB image data", which have been captured by the CCD 101 via the F/E-IC 102 and undergone the white balance setting and the gamma setting by the CCD 1-control block 104-1; "YUV image data", which have undergone conversion into luminance data and color difference data by the CCD 2-control block 104-2; and "JPEG image data", which have been JPEG-compressed by the JPEG CODEC block 104-7. The built-in memory 107 is a memory for storing photographed image data.

In addition, an LCD driver 108, a video amplifier (AMP) 109, and an audio CODEC 112 are connected with the digital still camera processor 104. The LCD driver 108 is a drive circuit configured to drive the LCD monitor 6. The LCD driver 108 also includes a function for converting a video signal output from the TV signal display block 104-9 into a signal for displaying on the LCD monitor 6. The LCD monitor 6 is a monitor for performing monitoring of a state of the object before shooting, verifying the photographed images, displaying of image data recorded on the memory card and the built-in memory 107, and the like. The video AMP 109 is an amplifier for converting a video signal output from the TV signal display block 104-9 by impedance conversion at 75Ω. A video jack 110 is a jack for connecting with an external display apparatus such as a TV set. The audio CODEC 112 converts audio data output from an audio block 104-12 into a signal that can be output from a speaker 113.

On the other hand, a strobe circuit 106, which performs flashing from the strobe emission unit 5, a distance measurement unit 114, which measures the distance to the object, a SUB-CPU 105, and an operation key unit switch (SW) 1-15 are connected to the CPU block 104-3. The operation key unit SW 1-15 is a key circuit operated by a user. The SUB-CPU 105 is a CPU that integrates a read-only memory (ROM) and a random access memory (RAM) into one chip. The SUB-CPU 105 outputs output signals of the operation key unit SW 1-15 and the like to the CPU block 104-3, as user operation information.

In the above-described configuration, the focus lens 4-2a of the focusing optical system 4-2 is the lens or the focus lens according to the present invention. In addition, the focusing motor 4-2b and the motor driver 4-5 are the lens driving units according to the present invention. Furthermore, the ring detection sensor 4-7 is a count pulse generation unit configured to generate a count pulse signal in accordance with an operation of the operation member. In other words, the ring detection sensor 4-7 is also the detection signal generation unit according to the present invention. The CPU block 104-3 of the digital still camera processor 104, in particular, is the lens driving control unit according to the present invention as well as being the detection unit or the count pulse signal detection unit for detecting the detection signal or the count pulse signal.

Figure 3A:
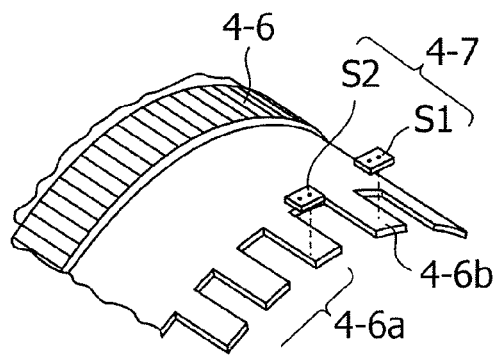
FIGS. 3A and 3B respectively illustrate a configuration of a count pulse signal detection unit.
Figure 3B:
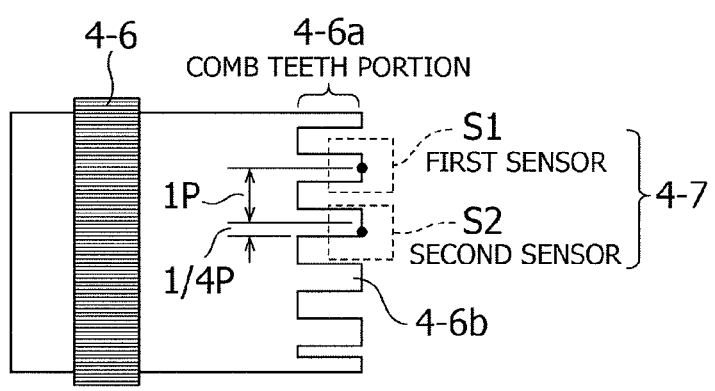

FIGS. 3A and 3B respectively illustrate the ring detection sensor 4-7, which detects the rotation of the MF ring 4-6 and outputs a detection signal, i.e., a count pulse signal in this embodiment. FIG. 3A is an outline perspective view illustrating the conceptual configuration of the ring detection sensor 4-7. In FIG. 3A, a comb teeth portion 4-6a, in which rectangular comb teeth 4-6b are formed in an intermittent manner by a constant pitch dimension (periodic dimension) along the circumferential direction on one side edge of the barrel integrated with the MF ring 4-6, is integrally formed. In addition, a first sensor S1 and a second sensor S2 are fixedly supported on a fixing portion (not illustrated) of the lens barrel 4 facing the comb teeth portion 4-6a. The first sensor S1 and the second sensor S2 are disposed at intervals of microscopic distance in the circumferential direction. The first sensor S1 and the second sensor S2 respectively include a light projection and receiving element, which includes a light projection portion and a light receiving portion, i.e. a photo interrupter. Accordingly, the state of the output signal varies according to whether a reflective light on the surface of the rectangular comb teeth 4-6b is received. The microscopic distance between the first sensor S1 and the second sensor S2 in the circumferential direction may be set in accordance with the dimension determined by an expression (1p*n+¼p) (n: an integer equal to or larger than zero, p: pitch dimension of the rectangular comb teeth 4-6b). In this embodiment, "n" is set to 1, and the microscopic distance is set in accordance with the dimension determined by the expression (1p+¼p).

Figure 3C:
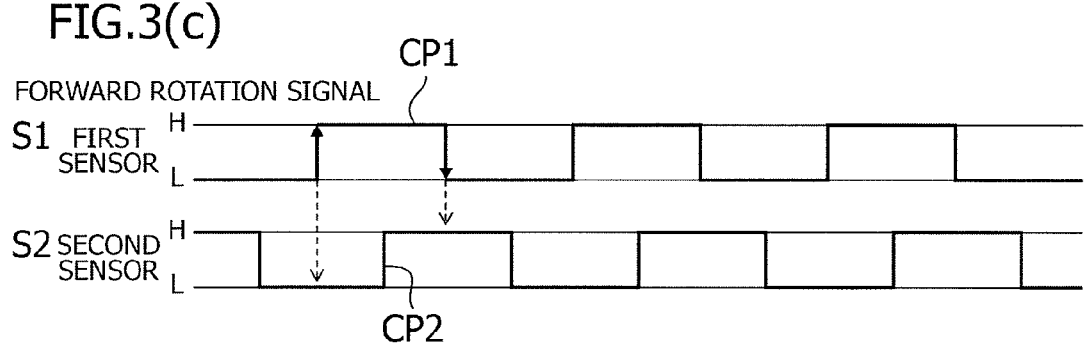
FIGS. 3C and 3D are timing charts of count pulse signals.

In the ring detection sensor 4-7, the detection signals detected by the first sensor S1 and the second sensor S2 when the MF ring 4-6 is rotated are count pulse signals CP1 and CP2, which vary as illustrated in FIG. 3C according to the operation direction. That is, when the respective sensors S1 and S2 are located at positions facing the rectangular comb teeth 4-6b, reflective light is received and high-level signals are output, and when the respective sensors S1 and S2 are located at positions between the rectangular comb teeth 4-6b, low-level signals are output because no reflected light is received there. Accordingly, the rectangular count pulse signals CP1 and CP2 are periodically output in accordance with the rotation of the MF ring 4-6. Because the microscopic distance between the first sensor S1 and the second sensor S2 in the circumferential direction is expressed as (1+¼)p (p: pitch dimension) as described above, the phases of the two count pulse signals CP1 and CP2 detected by the respective sensors S1 and S2 are shifted from each other by 90°.

Accordingly, by using the two count pulse signals CP1 and CP2, the CPU block 104-3 of the digital still camera processor 104 can detect the rotation amount, the rotation direction, and also the rotation speed of the MF ring 4-6. In FIG. 3C, when either one of the count pulse signals of the first sensor S1 and the second sensor S2, i.e., the count pulse signal CP1, is referred to, for example, because the count pulse signal CP1 is output in correspondence with the rectangular comb teeth 4-6b of the MF ring 4-6, a count period T for the count pulse signal CP1 becomes the rotation amount corresponding to the rotation of the MF ring 4-6 by the amount equivalent to one rectangular comb teeth 4-6b. Accordingly, the number of pulses of the count pulse signals CP1 corresponds to the rotation amount of the MF ring 4-6 as it is, and therefore, by performing counting for each rise time or fall time of the count pulse signal CP1, the rotation amount can be determined according to the number of counts. In addition, because a count period T for the count pulse signal CP1 is in correlation with the rotation speed of the MF ring 4-6, the rotation speed of the MF ring 4-6 can be determined based on the count period T.

Figure 3D:
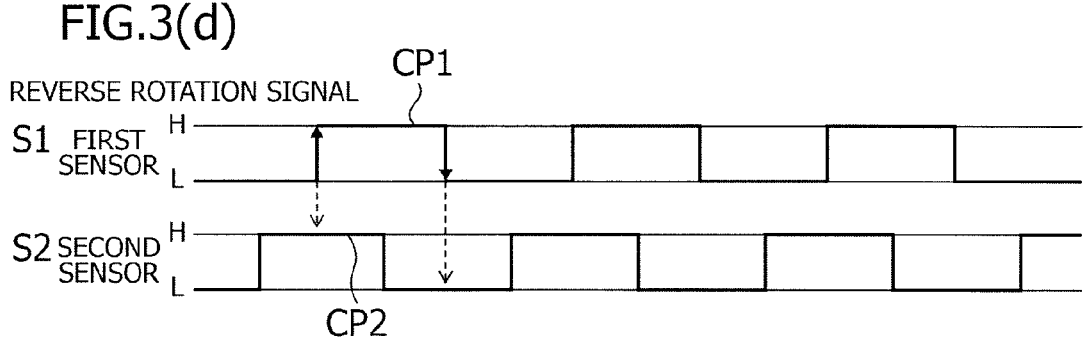

With respect to the rotation direction of the MF ring 4-6, both the count pulse signals CP1 and CP2 are referred to. For example, when the MF ring 4-6 is operated in the forward direction, the count pulse signals CP1 and CP2 from the first sensor S1 and the second sensor S2 become as illustrated in FIG. 3C. The count pulse signal CP2 is in the L-level at the rise time of the count pulse signal CP1 and in the H-level at the fall time of the count time of the count pulse signal CP1. On the other hand, when the MF ring 4-6 is operated in the reverse direction, the count pulse signals CP1 and CP2 become as illustrated in FIG. 3D. The count pulse signal CP2 is in the H-level at the rise time of the count pulse signal CP1 and in the L-level at the fall time of the count pulse signal CP1. That is, by determining the output levels of the count pulse signal CP2 at the rise time and the fall time of the count pulse signal CP1, the rotation direction of the MF ring 4-6 can be detected.

In the present invention, the focusing optical system 4-2 is capable of performing a focus control in the AF mode, i.e., the AF control, as described above. The control mode can be switched between the respective modes of the AF control mode and the MF control mode in the camera body 1. In addition, the above-described focusing motor 4-2b is provided to control focusing. As illustrated in FIG. 1, the focusing drive motor 4-2b includes a stepping motor that is rotationally driven by the drive pulse. A screw 4-2d, which extends in the direction of the optical axis of the lens, is coupled to a rotation output shaft of the focusing drive motor 4-2b. A lens frame 4-2c of the focus lens 4-2a is partially and threadedly engaged with the screw 4-2d. With this configuration, when the focusing drive motor 4-2b is rotationally driven, the screw 4-2d is axially rotated thereby, the lens frame 4-2c, which is threadedly engaged with the screw 4-2d, is moved along the screw 4-2d, and the focus lens 4-2a is moved in the direction of the optical axis. Thus, focusing is performed. In focusing of the focus lens 4-2a, other lenses may be moved at the same time in some cases. In such cases, a configuration is employed in which the lens is driven by using a cam barrel. In this embodiment, an example of lens driving which uses a screw is described for simpler description.

Figure 8:
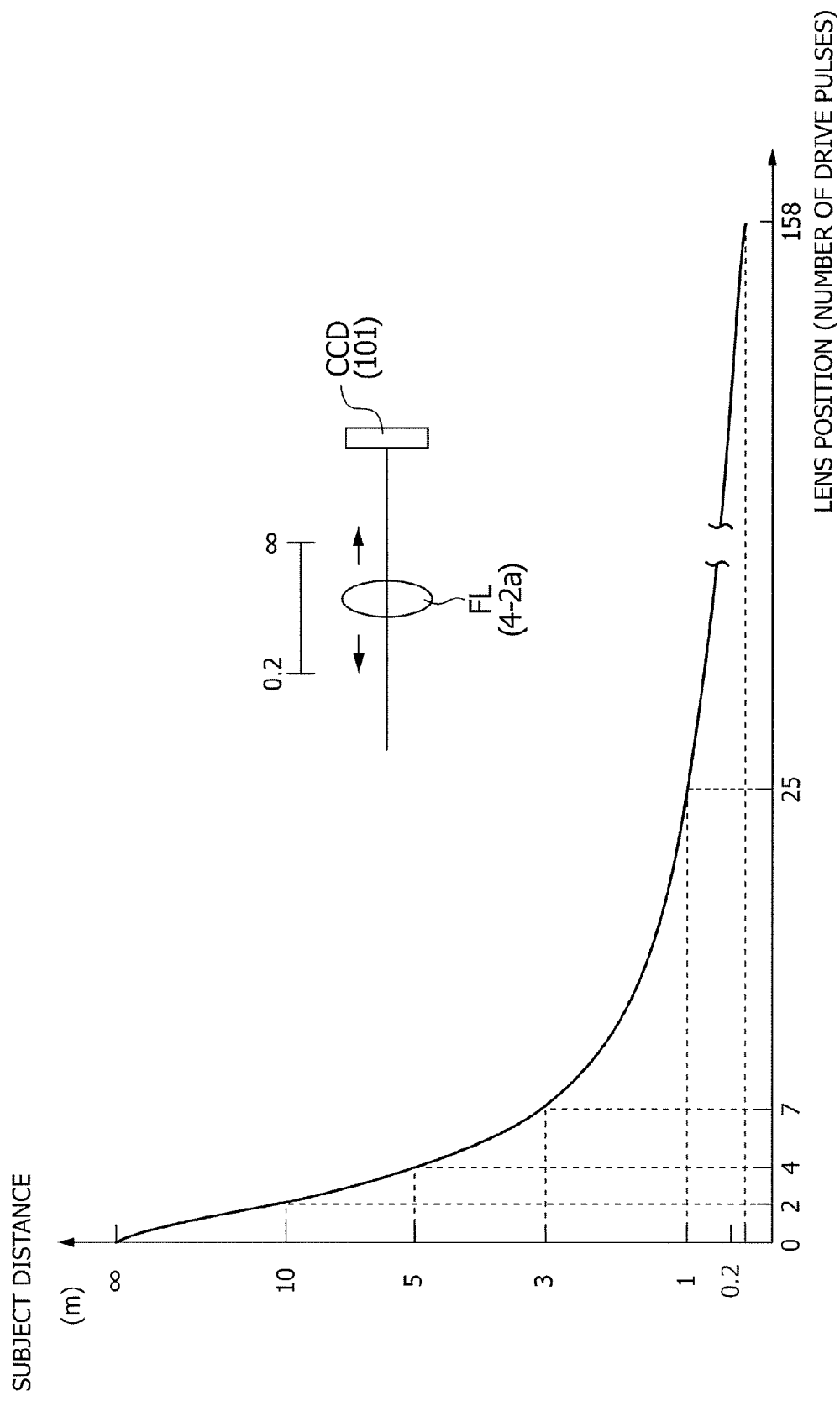
FIG. 8 illustrates the relationship between a focal position (an in-focus position) and the number of drive pulses.

In the focusing optical system 4-2, in performing the AF control, the CPU block 104-3 controls the motor driver 4-5 based on an output from the distance measurement unit 114 and supplies a drive pulse to the focusing drive motor 4-2b. Thus, the focusing drive motor 4-2b is driven to move the focus lens 4-2a. On the other hand, in the MF control, in which the focusing is manually carried out, the CPU block 104-3 controls the motor driver 4-5 based on a count pulse signal generated when the MF ring 4-6 is manually operated as described above, and supplies a drive pulse to the focusing drive motor 4-2b. Thus, the focusing drive motor 4-2b is driven. In order to perform the driving control of the focusing drive motor 4-2b, the number of drive pulses for driving the focusing drive motor 4-2b, which corresponds to the focus lens position is stored on the built-in memory 107. More specifically, as illustrated in FIG. 8, the correlation between the number of drive pulses and the focus position from the number of drive pulses "0" at the infinite distance position to the number of drive pulses "158" at the closest distance position is stored as the number of drive pulses to be supplied to the focusing motor when the focus lens 4-2a is moved from the infinite distance position to the closest distance position. Accordingly, the CPU block 104-3 detects the number of drive pulses currently supplied to the focusing motor 4-2b and compares the detected number of drive pulses with the number of drive pulses stored on the built-in memory 107. Thus, the CPU block 104-3 can recognize the current focus position of the focus lens 4-2a.

Figure 4:
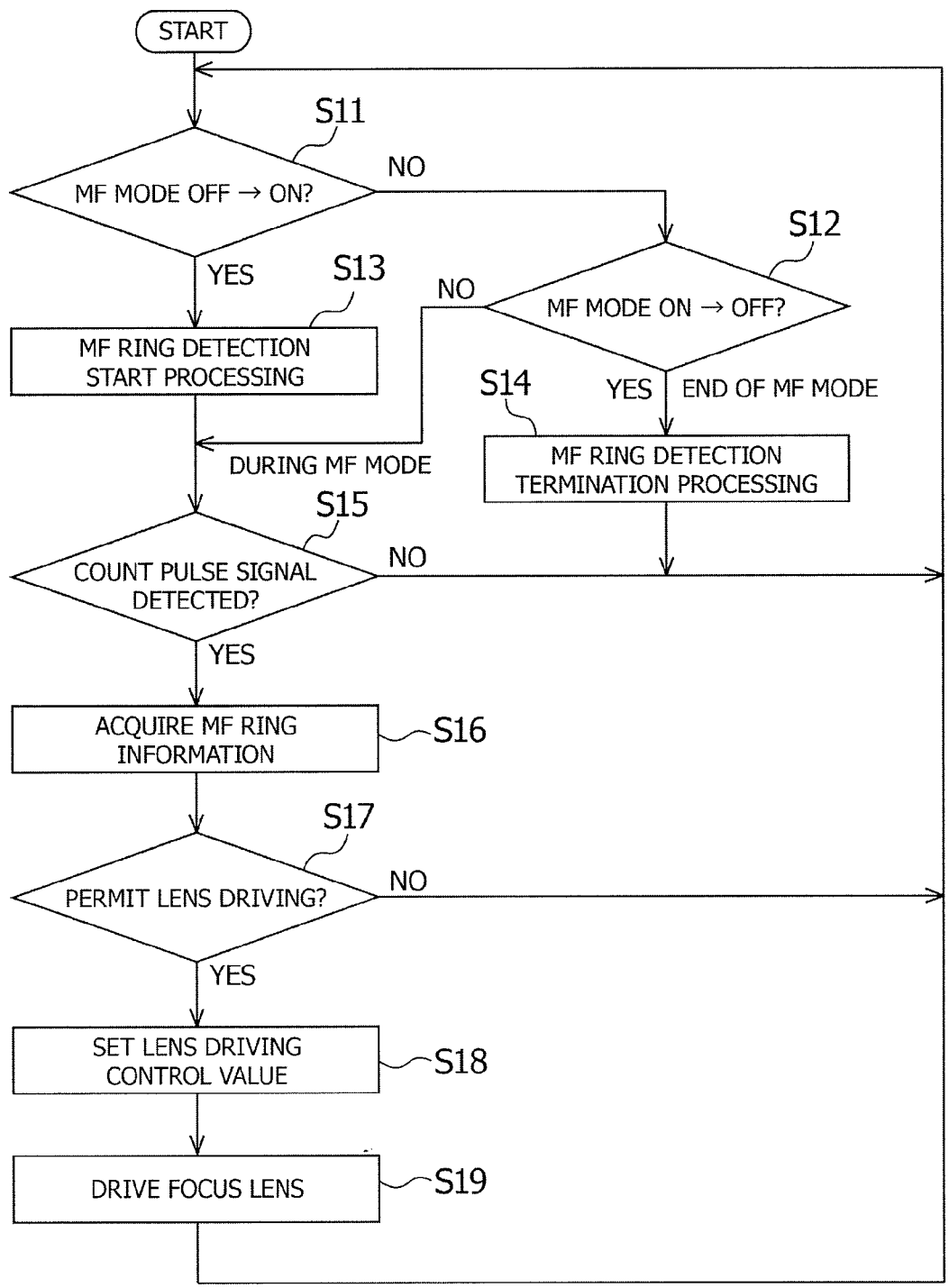
FIG. 4 is a flow chart illustrating processing performed in a manual operation.

Next, an exemplary manual focus operation performed when the MF mode is set as the control mode will be described below. FIG. 4 is a flow chart illustrating the outline of processing performed in the MF mode. The CPU block 104-3 detects the state of the setting set to the camera and determines whether the MF mode is set. If the MF mode has been set (when the switch has been shifted from OFF to ON) (S11), the CPU block 104-3 performs processing for starting MF ring detection (S13). In the present embodiment, when the photo interrupter included in the ring detection sensor 4-7 is powered ON, the count pulse signal generated according to a rotation operation of the MF ring 4-6 can be detected. On the other hand, when the MF mode has been cancelled (when the switch has been shifted from ON to OFF) (S12), the CPU block 104-3 performs processing for terminating the MF ring detection (S14). In this step, wasteful consumption of power is avoided by powering off the ring detection sensor 4-7.

After the MF ring detection start processing (S13) or during the MF mode, the CPU block 104-3 performs detection of count pulses from the ring detection sensor 4-7 (S15). If no count pulse has been detected, then the processing returns to the MF mode determination processing (S11). If any count pulse signal has been detected, the CPU block 104-3 performs MF ring information acquisition processing (S16). In the MF ring information acquisition processing, the CPU block 104-3 acquires the rotation amount (the number of counts), the rotation speed (the count period), and the rotation direction of the MF ring 4-6 as described above. Subsequently, the CPU block 104-3 executes lens driving permission determination (S17). In this lens driving permission determination, the CPU block 104-3 determines whether the number of counts of the detected count pulse signals is equal to or greater than 2 counts, or less than 2 counts). If the number of counts of the detected count pulse signals is equal to or greater than 2 counts, the CPU block 104-3 permits the lens driving. On the other hand, if the number of counts of the detected count pulse signals is less than 2 counts, the CPU block 104-3 does not permit the lens driving and returns to the MF mode determination (S11). This is intended to prevent unnecessary lens driving which may occur in a sensitive response to any microscopic rotation of the MF ring 4-6, by distinguishing the movement of the MF ring 4-6 occurring due to vibration and the like from the moving of the MF ring by a manual operation.

If the lens driving has been permitted, the CPU block 104-3 sets a lens driving control value (S18). The CPU block 104-3 controls the focusing drive motor 4-2b by using the motor driver 4-5 according to the set lens driving control value to drive the focus lens 4-2a (S19) in the above-described manner. Thus, the CPU block 104-3 executes the focusing. In this setting of the lens driving control value, the CPU block 104-3 sets the number of drive pulses for rotationally driving the focusing drive motor 4-2b in relation to the count pulse signals output when the MF ring 4-6 is rotationally operated. At the same time, the CPU block 104-3 sets the direction (positive or negative) of the drive pulse for determining the direction of rotation of the focusing drive motor 4-2b (the positive or the negative direction, i.e., the direction of the long distance side or the direction of the short distance side, for example).

For the setting of the number of drive pulses, the CPU block 104-3 performs a control for changing it in accordance with the position of the focus lens. For example, the CPU block 104-3 detects the position of the focus lens based on the current number of drive pulses stored on the built-in memory 107, and determines whether the detected focus lens position is on the long distance side or the short distance side on the basis of a reference distance 1 m. In the present embodiment, if the current number of drive pulses is less than 25 pulses with reference to the infinite distance position as a standard position, it is determined that the focus lens is on the long distance side, as illustrated in FIG. 8. Furthermore, if current number of drive pulses is equal to or more than 25 pulses with reference to the infinite distance position as a standard position, it is determined that the focus lens position is on the short distance side, as illustrated in FIG. 8. In addition, the CPU block 104-3 sets different lengths of the initial count detection time period for the count pulse signal for the long distance side and the short distance side. In addition, the CPU block 104-3 sets different number of drive pulses after the initial count detection time period for the long distance side and the short distance side.

FIGS. 5A and 5B are timing charts illustrating the setting of the number of pulses. As illustrated in FIG. 5A, if it is determined that the focus lens is positioned on the long distance side, then the CPU block 104-3 sets the time period for the first four count periods T for the detected count pulse signals, i.e., the time period for four count pulse signals, as the initial count detection time period. In addition, within the initial count detection time period, the CPU block 104-3 assigns one drive pulse MP, which is the minimum number of pulses, to the count pulse signal of one period so that the focus lens is moved by the minimum dimensional unit, i.e., in the highest resolving power. In addition, after the initial count detection time period elapses, the CPU block 104-3 assigns two drive pulses MP to the count pulse signal for one period so that the focus lens is moved by a dimensional unit greater than the minimum number of pulses.

On the other hand, if it is determined that the focus lens is positioned on the short distance side, as illustrated in FIG. 5B, the CPU block 104-3 sets the time period for the first two count periods T for the detected count pulse signals, i.e., the time period for two count pulse signals, as the initial count detection time period. The first two count periods T are shorter than the initial count detection time period for the case in which the focus lens is positioned on the long distance side.

Furthermore, within the initial count detection time period, the CPU block 104-3 sets one drive pulse MP, which is the minimum number of pulses, to the count pulse signal for one period so that the lens driving amount becomes the amount in the minimum dimensional unit. After the initial count detection time period elapses, the CPU block 104-3 assigns the number of pulses greater than the minimum number of pulses to one count pulse signal so that the lens driving amount becomes an amount greater than that in the case in which the focus lens is positioned on the long distance side. In this embodiment, three drive pulses MP are assigned. Note that in this embodiment, as is known from FIGS. 5A and 5B, an example is illustrated in which the speed of the rotation operation of the MF ring 4-6 is gradually changed to gradually change the count period T. However, the above-described number of drive pulses MP to be assigned is not changed if the count period T for the count pulse signal is changed as the speed of the rotation operation of the MF ring 4-6 is changed.

Figure 6:
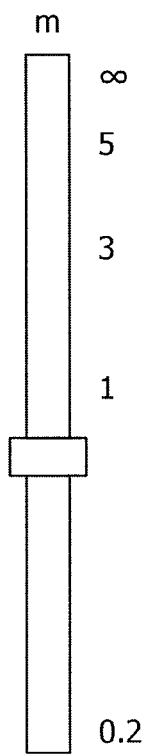
FIG. 6 illustrates a form, displaying a focal position, on a liquid crystal display (LCD) monitor.

When the photographer operates the MF ring 4-6 after the lens driving control value is set in the above-described manner, the CPU block 104-3 detects the count pulse signal, outputs a drive pulse to the motor driver 4-5 based on the count pulse signal, and drives the focusing drive motor 4-2b to move the focus lens 4-2a. In this process, a display of a focus bar illustrated in FIG. 6, which is displayed in a part of a display screen of the LCD monitor 6 provided in the camera body 1, is updated in conjunction with the variation of the focus lens position, although detailed description thereof is omitted here.

In this driving of the focus lens, referring to FIG. 5A again, if the focus lens position has been determined to be on the long distance side, the CPU block 104-3 detects the rise of a count pulse signal CP generated when the MF ring 4-6 is rotated. Then, the CPU block 104-3 calculates the number of counts. If the number of counts is equal to or less than four pulses which corresponds to the initial count detection time period, the CPU block 104-3 sets one pulse which is the minimum number to the number of drive pulses MP for the count pulse signal CP for one count period to. Furthermore, the CPU block 104-3 supplies the drive pulses MP to the focusing drive motor 4-2b in synchronization with the rise of the count pulse signal CP to control the driving of the focusing drive motor 4-2b. If the calculated count pulse signals CP has exceeded four pulses and the initial count detection time period has elapsed, then the CPU block 104-3 sets two pulses, which is the number greater than the minimum number, as the number of drive pulses MP for the count pulse signal for one count period. In addition, the CPU block 104-3 supplies the drive pulses MP to the focusing drive motor 4-2b in synchronization with the rise of the count pulse signal CP to control the driving of the focusing drive motor 4-2b. If the count pulse signal CP is continuously detected during this driving, the driving control is continued while the count pulse signal CP is continuously detected.

By performing the lens driving of the focus lens 4-2a in the above-described manner, quick and precise focusing can be performed by an operation of the MF ring 4-6. That is, as illustrated in FIG. 8, the resolving power is low and the focal length (the distance to the object to be focused) greatly varies by a small number of drive pulses. However, when the focus lens 4-2a is positioned on the long distance side, within the initial count detection time period, the CPU block 104-3 sets one pulse as the number of drive pulses MP for the count pulse signal CP for one count period T, and controls the moving of the focus lens 4-2a to be extremely slowly performed. On the other hand, after the initial count detection time period, the CPU block 104-3 sets two pulses as the number of the drive pulse MP for the count pulse signal for one count period T. Accordingly, the focus lens 4-2a can be moved at a relatively high speed. With this configuration, focusing can be quickly performed through the wide range on the long distance side.

Figure 7:
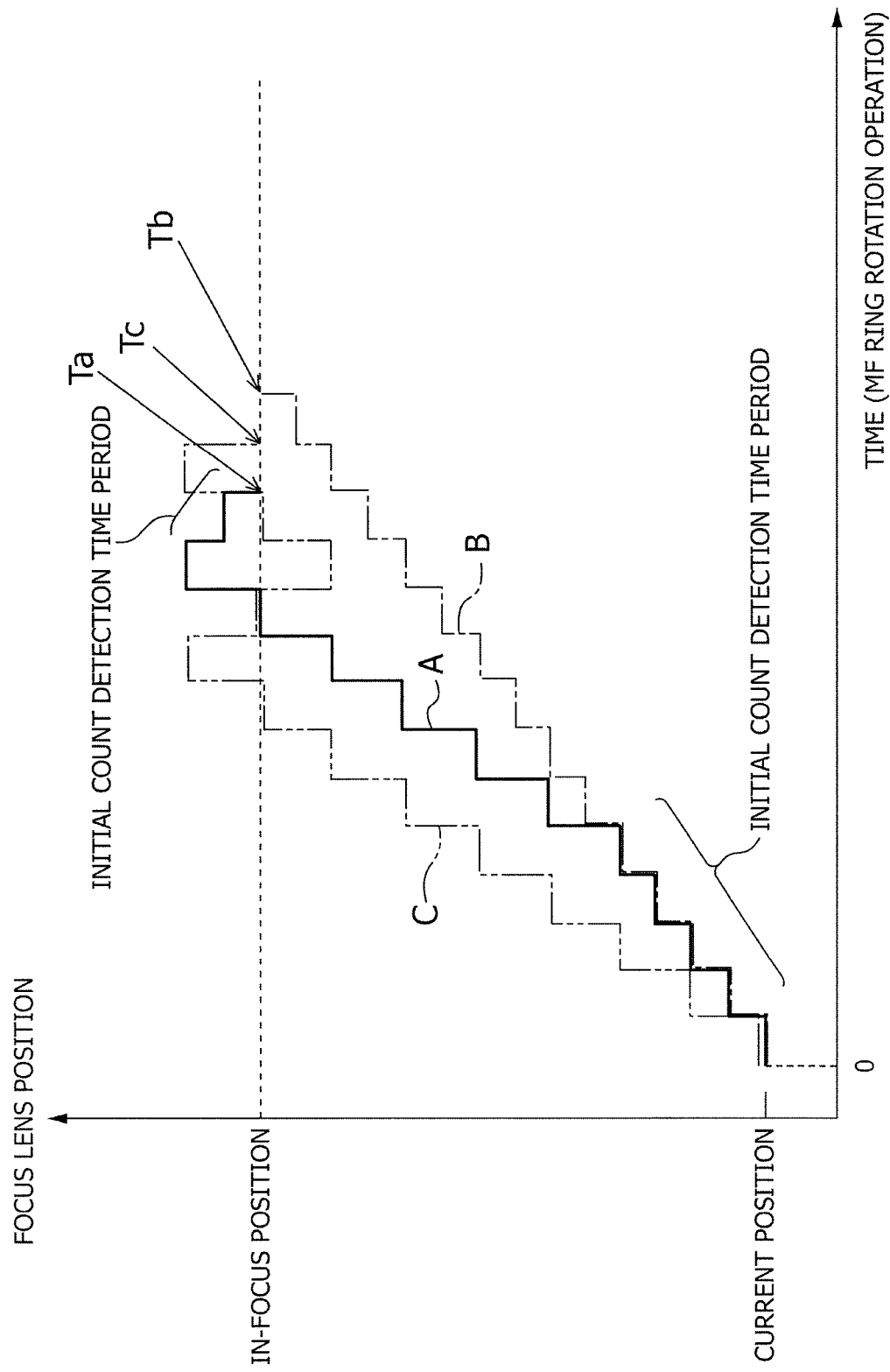
FIG. 7 is a timing chart for explaining an advantageous effect of a focusing operation according to the present invention.

When the focus lens 4-2a positioned on the long distance side is moved by a large amount, the focus lens 4-2a is moved as illustrated in FIG. 7, which shows an example of focusing time by a solid line A. During the first initial count detection time period, the focus lens 4-2a is moved by the unit of the minimum dimension according to one drive pulse MP for respective one count period T, when the MF ring 4-6 is rotationally operated. On the other hand, in the fourth period for the initial count detection time period and beyond, two pulses are set as the number of drive pulses MP for the count pulse signal CP for one count period, and thus the unitary dimension for moving the focus lens 4-2a is increased. With this configuration, the focus lens 4-2a is quickly moved to a position close to the in-focus position. In this process, when the speed of the rotation operation of the MF ring 4-6 becomes high, the speed of moving the focus lens 4-2a becomes high, following this increase in the speed of rotation operation. Then, the operation of the MF ring 4-6 is temporarily stopped at a position close to the in-focus position, i.e., at the position beyond the in-focus position in this embodiment. When the MF ring 4-6 is subsequently operated by rotating it in the reverse direction, the detection of a count pulse signal CP is suspended due to the rotation stop or the reverse rotation of the MF ring 4-6. Furthermore, the control is reset due to the stopped detection of the count pulse signal CP. In the next operation, the lens driving control is performed again from the four periods in the initial count detection time period. Accordingly, the focus lens is moved by a minute distance in the minimum unitary dimension again according to one drive pulse MP set for one count period T. With this configuration, the focus lens can be precisely set to the in-focus position at a timing Ta by one operation.

For comparison, a hypothetical case of lens driving, in which the initial count detection time period is not provided, is illustrated in FIG. 7. For example, the minimum number of one pulse is set to the number of drive pulses MP for one count period for the count pulse signal CP generated by a rotation operation of the MF ring 4-6. Then, the moving speed of the focus lens 4-2a becomes low, as illustrated in FIG. 7 by alternate long and short dashed lines B. In this case, the unitary dimension for moving the focus lens becomes small, and thus the focusing can be precisely performed. However, it becomes difficult to quickly perform the focusing because the focus lens is set at the in-focus position at a timing as late as a timing Tb. On the other hand, two pulses, which is a large number of pulses, is set as the number of drive pulses MP for one count period for the count pulse signal CP generated by a rotation operation of the MF ring 4-6 at the beginning of the process. Then, the moving speed of the focus lens 4-2a becomes high, as illustrated in FIG. 7 by chain double-dashed lines C. In this case, the focus lens can be quickly moved. However, it becomes difficult to precisely set the focus lens position to the in-focus position by one operation because the minimum unitary dimension for moving the focus lens becomes large. Furthermore, the focus lens position is set to the in-focus position at a timing as late as a timing Tc, which is a timing after a plurality of repeated operations has been done. As a result, it takes a long time to complete the focusing. Accordingly, it becomes difficult to quickly perform the focusing.

On the other hand, if it is determined that the lens is positioned on the short distance side, referring to FIG. 5B again, the CPU block 104-3 detects the rise of the count pulse signal CP generated by the rotation of the MF ring 4-6. Then, the CPU block 104-3 sets one pulse as the number of drive pulses MP if the number of counts is equal to two pulses or less, which is the number of pulses for the initial count detection time period. Subsequently, the CPU block 104-3 performs the driving control of the focusing drive motor 4-2b in synchronization with the rise of the count pulse signal CP. If the number of counts has exceeded two pulses and the initial count detection time period has elapsed, the CPU block 104-3 sets three pulses as the number of drive pulses MP and performs the driving control of the focusing drive motor 4-2b in synchronization with the rise of the count pulse signal CP. In this case also, if the count pulse signal CP is detected during the driving, the driving control is continued while the count pulse signal CP is continuously detected.

Particularly when the focus lens 4-2a is positioned on the short distance side, it is difficult to quickly move the focus lens 4-2a to the in-focus position by moving the MF ring 4-6 by operating it by a short amount only, because the resolving power of the drive pulse MP is high on the short distance side. In this embodiment, the initial count detection time is set as short as two count periods. Accordingly, the initial count detection time period elapses immediately after the start of an operation of the MF ring 4-6. In addition, after the initial count detection time period elapses, three pulses is set as the number of drive pulses MP for one count period T, and thereby the focus lens 4-2a is moved to a position close to the in-focus position at a high speed. In this process, if the speed of rotation operation of the MF ring 4-6 becomes high, the speed of moving the focus lens becomes as high following the increase of the speed of rotation of the MF ring 4-6. Although not illustrated in the drawing, substantially similarly to the case in which the focus lens 4-2a is positioned on the long distance side described above with reference to FIG. 7, when the operation of the MF ring 4-6 is temporarily stopped at a position close to the in-focus position and the MF ring 4-6 is subsequently operated again, then the focus lens 4-2a is moved by the minute unitary dimension within two count periods in the initial count detection time period again. Accordingly, the focusing can be precisely performed. If the focusing is not completed after the initial count detection time period of two count periods has elapsed, the focus lens 4-2a is quickly moved to a position close to the in-focus position because it is moved according to three drive pulses again. In performing final focusing, the focusing is performed within the initial count detection time period of two count periods. Accordingly, precise focusing can be implemented. Similarly to the case in which the focus lens 4-2a is positioned on the long distance side, it is difficult to precisely and quickly perform focusing unless an initial count detection time period is provided.

As described above, the initial count detection time period is provided at the start of moving of the focus lens 4-2a. In addition, the minimum number of one, which is a number for the small unitary dimension, is set as the number of drive pulses for moving the focus lens 4-2a. Furthermore, after the initial count detection time period elapses, a large number of drive pulses is set to increase the unitary dimension for moving the lens. With this configuration, the focusing of the focus lens 4-2a can be quickly and precisely performed. In addition, the initial count detection time period is set in correspondence with the difference of the resolving power for moving the focus lens 4-2a. That is, a long initial count detection time period is set for the long distance side on which the resolving power is low, and a short initial count detection time period is set for the short distance side on which the resolving power is high. Accordingly, quick and precise focusing can be implemented regardless of the difference in the resolving power. In the description above, the focusing of the focus lens 4-2a when it is positioned on the long distance side or the short distance side is described. Note that the above embodiment can be applied in a case in which the focus lens 4-2a is moved from the long distance side to the short distance side or vice versa. In other words, quick and precise focusing can be implemented in both cases.

In this embodiment, the number of points, at which the long distance side and the short distance side for the focus lens 4-2a are shifted, is one, and the shifting point is 1 m, as described above. However, a plurality of shifting points can also be set. In addition, the length of the initial count detection time period, the number of drive pulses for the initial count detection time period, and furthermore, the number of drive pulses set for the time after the initial count detection time period has elapsed are not limited to those of the configuration of the above-described embodiment and can be appropriately set. For example, two shifting points can be set at the distances of 1 m and 0.5 m to provide three distance ranges and the number of drive pulses to be assigned can be changed for respective ranges. In this case, the following configuration can be employed. More specifically, if the focus lens 4-2a is positioned at a long distance lens position ranging from an infinite distance position to 1 m, four count periods are set as the initial count detection time period. Furthermore, after the initial count detection time period, the drive pulses are supplied in the unit of two count periods for the count pulse signal to control the driving of the focusing drive motor 4-2b. If the focus lens 4-2a is positioned at a middle-distance lens position ranging from 1 m to 0.5 m, three count periods are set as the initial count detection time period. After the initial count detection time period, the drive pulses are supplied in the unit of one count period for the count pulse signal to control the driving of the focusing drive motor 4-2b. If the focus lens 4-2a is positioned at a short-distance lens position shorter than 0.5 m, two count periods are set as the initial count detection time period. After the initial count detection time period, the drive pulses are supplied in the unit of half a period for the count pulse signal to control the driving of the focusing drive motor 4-2b.

In this embodiment, an example is explained in which the focus lens 4-2a is moved by a manual operation of the MF ring 4-6 provided on the lens barrel 4, and the focusing is performed. For the operation member according to the present invention, a configuration can be applied in which the focus lens is moved by operating a rotational operation member, such as a dial type operation disk, and the like provided in the camera body 1. In addition, in this embodiment, an example is explained in which the lens according to the present invention is applied to a focus lens. However, the lens according to the present invention can be applied to lenses of any other types moved by a manual operation, such as zoom lenses. In this case, because the resolving power of drive pulses from a zoom motor is not even in relation to the variation of the focal length of a zoom lens, the length of an initial count detection time period and the number of drive pulses may be set in accordance with the focal length position of the zoom lens. Furthermore, in some cases, the resolving power at the in-focus position of a focus lens may not become even following the variation of the focal length of the zoom lens. Accordingly, in such cases, the length of the initial count detection time period and the number of drive pulses for the focusing motor may be set in accordance with the focal length of the zoom lens.

In the present invention, although not particularly described as an example in the above-described embodiment, the length of an initial count detection time period and the number of drive pulses may be appropriately changed in accordance with an operation speed of the operation member. Furthermore, the number of drive pulses after the initial count detection time period has elapsed also may be set so that it is increased or decreased following the operation speed of the operation member. In particular, the operation speed of the operation member may be different among operation members which have different operability, i.e., among operation members such as an MF ring and other rotation operation member. Therefore, if such an operation member is used, it is preferable to set an optimum number of drive pulses according to an average operation speed that is empirically determined.

Furthermore, the operation member according to the present invention is not limited to a rotation operation member. More specifically, an operation member with a slidable configuration or an operation member such as an operation button may be used. Moreover, the detection signal output when the operation member is operated is not limited to the pulse signal of the above-described embodiment. More specifically, a signal corresponding to the operation amount or the operation time of the operation member, such as a voltage signal, a current signal, or a sine wave signal may be used.

According to this embodiment, the amount of lens driving performed according to the drive signals with respect to the detection signal is differently set between an operation initial time period for an operation of the operation member and a time period after that. Therefore, the lens moving amount in relation to an operation of the operation member, i.e., the sensitivity for the lens moving amount in relation to an operation of the operation member, can be differently set between the operation initial time period and a time period after that. Accordingly, a lens driving apparatus having freely selected operability of the lens can be achieved. In particular, in the operation initial time period, the lens moving amount is controlled to be small, and in a time period after that, the lens moving amount is controlled to be large. With this configuration, the lens position can be precisely set for the operation initial time period because of the characteristic of the lens driving control, and the lens position can be quickly set for a time period after that.

According to this embodiment, if a specific configuration is employed in which the lens is driven according to the drive pulse corresponding to the count pulse signal that is detected when the operation member is operated, the following controls can be performed. That is, the lens driving control unit controls the number of drive pulses corresponding to the detected count pulse signal for an initial time period for the detected count pulse signal and for a time period after that. Then, the lens moving amount is set to be small for the operation initial time period and the lens moving amount is set to be large for a time period after the operation initial time period. Accordingly, the lens position can be precisely set for the operation initial time period because of a characteristic of the lens driving control, and the lens position can be quickly set for the time period after the operation initial time period. In particular, when the operation member includes a manual focus ring provided on the lens barrel and the lens includes a focus lens built in the lens barrel, the focusing by the focus lens can be quickly and precisely performed.

Furthermore, the number of drive pulses controlled by the lens driving control unit for a period after an initial count detection time period, which is an operation initial time period, is larger than the number of drive pulses for a time period within the initial count detection time period. With this configuration, the focus lens can be precisely set to the in-focus position by utilizing the lens driving control for the operation initial time period, and the focus lens can be quickly set to the in-focus position by utilizing the lens driving control for the time period after the operation initial time period. In addition, even if the resolving power of the drive pulse with respect to the variation of the in-focus position of the focus lens is not even, the number of drive pulses for the time period after the initial count detection time period is controlled to be different according to the lens position of the focus lens. With this configuration, the focus lens position can be further quickly set.

In this embodiment thereof, the setting of the lens to a predetermined position, particularly the setting of the focus lens to the in-focus position, can be quickly and precisely performed.

The present invention is useful if it is employed in a lens driving apparatus which controls the number of drive pulses to be supplied to a motor according to a detection signal detected when an operation member is manually operated, such as a count pulse signal, to drive a lens. Particularly, the present invention is useful if it is employed on a lens driving apparatus that has a characteristic in which the resolving power of the lens moving amount according to the drive pulses is not even.

Hereinabove, an embodiment of the present invention has been described; however the present invention is not limited to the described embodiment, and various changes and modifications are possible based on technical concepts of the present invention.

The disclosure of Japanese Application No. 2013-015014 filed on Jan. 30, 2013 including specification, claims, drawings and abstract thereof is incorporated herein by reference in its entirety.

REFERENCE SIGNS LIST

1 Camera body
4 Lens barrel
4-2 Focusing optical system
4-2a Focus lens (lens)
4-2b Focusing motor (lens driving unit)
4-5 Motor driver (lens driving unit)
4-6 MF ring (operation member)
4-7 Ring detection sensor (count pulse signal generation unit)
S1, S2 Sensors
101 CCD
104 Digital still camera processor
104-3 CPU block (detection signal detection unit, count pulse signal detection unit, lens driving control unit)

What is claimed is:

1. A lens driving apparatus comprising:
a signal detector that detects an output signal according to an operation of an operation member;
a lens driver which drives a lens in correspondence with a drive input signal; and
a lens driving controller which controls an amount of lens driving performed according to the drive input signal to the lens driver, based on the detected output signal detected by the signal detector,
wherein the lens driving controller is configured to control the drive input signal so that the lens driving amount corresponding to the detected output signal is different between a time period within an initial detection time period for the detected output signal and a time period after the initial detection time period.

2. The lens driving apparatus according to claim 1, wherein the lens driving amount controlled by the lens driving controller for the time period after the initial detection time period is larger than the lens driving amount for the time period within the initial detection time period.

3. The lens driving apparatus according to claim 2, wherein the lens driving amount for the time period after the initial detection time period differs according to a difference in lens positions of the lens.

4. The lens driving apparatus according to claim 1, wherein the operation member comprises a manual focus ring provided on a lens barrel, the lens comprises a focus lens in the lens barrel and the lens driver comprises a unit that moves the focus lens in a direction along an optical axis of the lens.

5. The lens driving apparatus according to claim 4, wherein the lens driving amount for the time period after the initial detection time period differs in accordance with a lens position of the focus lens.

6. The lens driving apparatus according to claim 5, wherein the lens driving amount for the time period after the initial detection time period is larger when the focus lens position is on a short distance side than when the focus lens position is on a long-distance side.

7. The lens driving apparatus according to claim 4, wherein the initial detection time period is different according to a lens position of the focusing lens.

8. The lens driving apparatus according to claim 7, wherein the initial detection time period is longer when the focus lens position is on the long-distance side than when the focus lens position is on the short distance side.

9. A lens driving apparatus comprising:
a count pulse generator that generates a count pulse signal according to an operation of an operation member;
a count pulse signal detector that detects the generated count pulse signal;
a lens driver which moves a lens in correspondence with the number of input drive pulses; and
a lens driving controller that controls the number of the input drive pulses to the lens driver according to the detected count pulse signal,
wherein the lens driving controller controls the number of the input drive pulses with respect to the detected count pulse signal so that the number of the input drive pulses is different between a time period within an initial count detection time period for the detected count pulse signal and a time period after the initial count detection time period.

10. The lens driving apparatus according to claim 9, wherein the operation member is a manual focus ring provided on a lens barrel, the lens is a focus lens built in the lens barrel, and the lens driver is a unit that moves the focus lens in a direction along an optical axis of the lens.

11. The lens driving apparatus according to claim 10, wherein the number of the input drive pulses for the time period after the initial count detection time period differs according to a lens position of the focus lens.

12. The lens driving apparatus according to claim 11, wherein the number of the input drive pulses for the time period after the initial count detection time period is larger when the focus lens position is on a short distance side than when the focus lens position is on a long distance side.

13. The lens driving apparatus according to claim 10, wherein the initial count detection time period is different according to a lens position of the focus lens.

14. The lens driving apparatus according to claim 13, wherein the initial count detection time period is longer when the focus lens position is on the long distance side than the initial count detection time period set when the focus lens position is on the short distance side.

15. The lens driving apparatus according to claim 9, wherein the number of the input drive pulses controlled by the lens driving controller for the time period after the initial count detection time period is larger than the number of the input drive pulses for the time period within the initial count detection time period.

16. The lens driving apparatus according to claim 15, wherein the number of the input drive pulses for driving by the lens driver for the time period within the initial count detection time period is a minimum unit number, and wherein the lens driver is configured to move the lens according to one pulse of the input drive pulses as the minimum unit number.

17. A method for driving a lens, the method comprising:
detecting a signal output when an operation member is operated, by using a signal detector;
controlling an input drive signal to a lens driver according to the signal output, by using a lens driving controller; and
driving a lens according to the input drive signal, by using the lens driver,
wherein the lens driving controller performs a control for setting an amount for driving of the lens performed according to the input drive signal based on the detected signal output so that the amount for driving of the lens for a time period after an initial signal detection time period is larger than the amount for a time period within the initial signal detection time period for the detected signal output.

18. The method for driving a lens according to claim 17, wherein the amount for driving of the lens for the time period after the initial signal detection time period differs according to a difference in lens position of the lens.

19. A method for driving a lens, the method comprising:
detecting a count pulse signal generated by a count pulse generator when an operation member is operated, by using a count pulse signal detector;
controlling a number of input drive pulses to a lens driver according to the detected count pulse signal, by using a lens driving controller; and
moving a lens in correspondence with the number of input drive pulses, by using the lens driver,
wherein the lens driving controller performs control for setting a number for the number of input drive pulses with respect to the detected count pulse signal so that the number for the number of input drive pulses for a time period after an initial count signal detection time period is greater than the number for the number of drive pulses for a time period within the initial count signal detection time period for the detected count pulse signal.

20. The method for driving the lens according to claim 19, wherein the number of the input drive pulses for the time period after the initial count signal detection time period differs according to a position of the lens.

* * * * *